July 16, 1968 J. H. DE FREES 3,392,956
VALVE
Filed Dec. 30, 1965 2 Sheets-Sheet 1

INVENTOR.
JOSEPH H. DE FREES
BY
Baldwin, Doran & Egan
ATTORNEYS

United States Patent Office 3,392,956
Patented July 16, 1968

3,392,956
VALVE
Joseph H. De Frees, Warren, Pa., assignor to
June (De Frees) Heelan, Moorestown, N.J.
Filed Dec. 30, 1965, Ser. No. 517,668
1 Claim. (Cl. 251—144)

ABSTRACT OF THE DISCLOSURE

A remote-controlled, pressurized hydraulic fluid-operated outlet valve for a fluid storage tank including a reciprocable plunger having an inwardly-flared, annular, flexible skirt selectively engageable with an annular valve seat on the tank bottom outlet opening to control the flow of stored fluid therethrough. The plunger is circumferentially rotatable to effect even wear on the flexible skirt. An air bleeding means is provided to vent air inadvertently trapped in the valve hydraulic fluid system. Spring tensioned packing means prevent contamination of the stored fluid with hydraulic fluid. The valve is positioned interiorly of the tank for damage prevention and may be very easily removed for inspection and cleaning.

---

This invention relates to valves and more particularly to discharge or outlet valves used in connection with tanks or containers for the storage or transportation of liquids.

As is required by the Interstate Commerce Commission and by various states, the outlet opening of liquid storage or transportation tanks containing certain products must be provided with a safety valve, preferably remotely controlled. Prior valves that are operated hydraulically cannot be easily cleaned and do not have metal-to-metal seating. Additionally, such prior devices usually extend exteriorly of the tank and are thus easily subject to damage. Internal valves are less easily damaged and require less room for piping.

An object of the invention is to provide a liquid storage tank outlet valve that effects a tight seal for an extended period of time and under all weather conditions.

A further object of the invention is to provide a storage tank outlet valve positioned interiorly of the tank.

A further object of the invention is to provide a storage tank outlet valve that is simple in construction, inexpensive to manufacture and highly effective in operation.

Briefly, the foregoing objects are accomplished by a pressurized fluid-operated outlet valve for a fluid storage tank and including a base portion having a fluid outlet opening and also including a plunger reciprocable to and from the opening to seal the same. The outlet opening is annular and contains a valve seat around the periphery thereof. The base is detachably connected to the tank fluid discharge opening whereby the base outlet opening and the tank discharge opening are in series such that the plunger controls flow of fluid through the tank opening. The base contains a centrally disposed upstanding cylinder having a longitudinal bore open at the top. The plunger includes a hollow cylinder having, interiorly thereof, a pendant piston extending into the bore of the base cylinder in reciprocable and rotative relation therewith. A pressure cavity is formed between the free end of the piston and the adjacent closed end of the base cylinder bore in which pressurized fluid (from a suitable source of fluid pressure) may be introduced thereinto in a predetermined manner to raise the plunger. The plunger is lowered by a coiled spring or springs held under compression between spring retainers on the plunger and on the base cylinder, respectively, said spring retainers and coiled spring or springs being disposed interiorly of the plunger. The lower edge of the cylinder portion of the plunger is flared or angled inwardly to form an effective flexible seal means in coaction with the valve seat to tightly seal the outlet opening under all conditions of use. The plunger, and substantially all of the base portion of the valve, are disposed interiorly of the tank to avoid damage.

Other objects and advantages of the invention will be apparent from the following description taken in conjunction with the drawings wherein.

Figure 1:
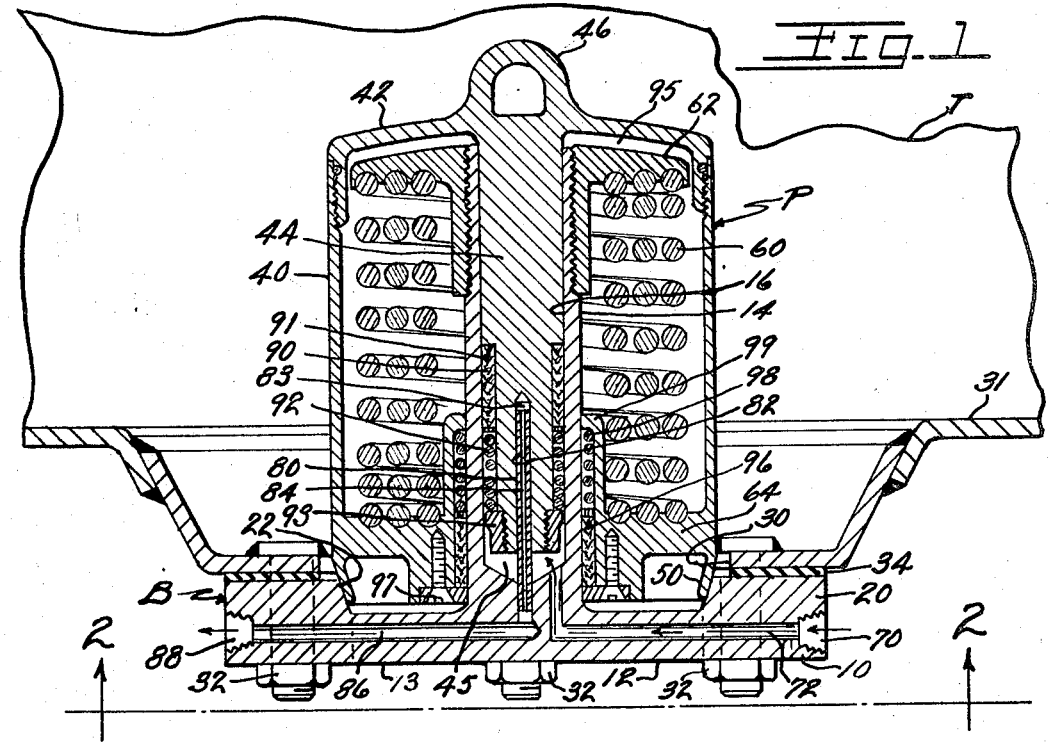
FIG. 1 is a portional front elevational sectional view of a valve of the invention and taken along the line 1—1 of FIG. 2, with the valve shown in closed position, and showing the valve disposed in operative position on the discharge opening of a fluid storage tank.
Figure 2:
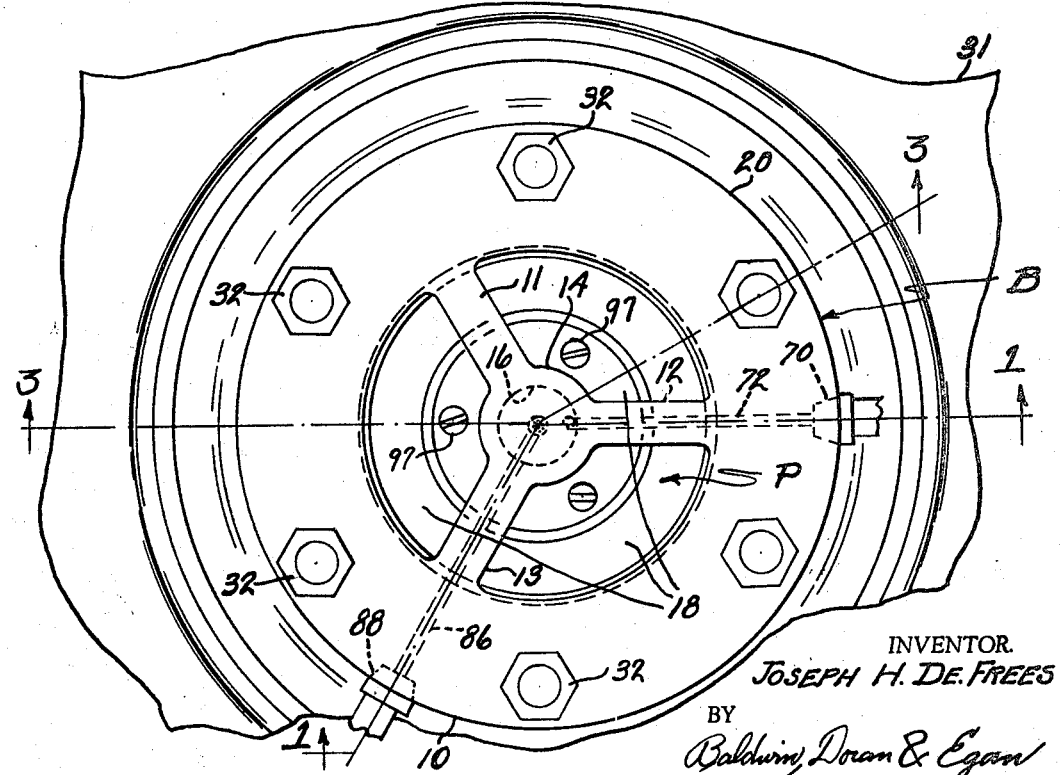
FIG. 2 is a bottom view of the valve shown in FIG. 1 and taken along the line 2—2 thereof.

Although the invention is shown and described herein with reference to fluid storage tank and transportation tank discharge valves, it will be understood that it may be employed on any type of valve for controlling the flow of fluids.

Referring to the drawings, there is shown a valve of the invention and including, as main components, the base B and the plunger P, said valve being secured to the fluid discharge opening of an associated storage tank T, as will be later described in detail.

The base B includes an annular ring 10 having inwardly extending radial arms 11, 12 and 13 which support, at their juncture, a centrally disposed upstanding member or cylinder 14 having a longitudinal bore 16 open at the top. Between the radial arms 11, 12 and 13, are passageways forming the valve fluid outlet or opening 18. The ring 10 has an annular raised outer flange portion 20 having an annular beveled valve seat 22 formed thereon, the purpose of which will hereinafter be described. The base B of the valve may be secured to a fluid storage tank discharge opening 30 of the storage tank floor plate 31 by any suitable means such as the bolts 32, the discharge flow of fluid from the tank through the openings 30 and 18 being indicated by the arrows in FIG. 3. A gasket 34 may be interposed between the tank floor plate and the base flange 20 to provide a tight seal therebetween. The base contains means for receiving the plunger in reciprocable and rotative relation therewith, now to be described.

The plunger P is of hollow cylindrical construction and includes a cylindrical body 40 closed at the top with a top closure 42 threaded into the top of the body 40, and a pendant piston 44 extending downwardly from the top closure and into the base cylinder bore 16 in coacting relation therewith. A fluid pressure cavity 45 is formed between the lower end of the piston 44 and the adjacent bottom closed end of the bore 16. A bail 46 may be provided on the top closure 42. The lower annular edge of the body 40 is flared or angled inwardly to form a thin flexible skirt 50 which engages or seats against the base valve seat 22 when the plunger is in closed position as shown in FIG. 1 to seal the openings 18 and 30. The skirt 50 is relatively thin in cross-section, the preferred cross-sectional dimension being 0.06 to 0.07 inch thick. The skirt is angled inwardly toward the longitudinal axis of the plunger at an angle of 8° to 12°, an angle of 10° being preferred. The above-described structure of the skirt 50 enables the same to bend or flex inwardly when it contacts the seat 22 thereby effecting a more positive fluid-tight seal thereat.

The plunger is held in a normally-closed position by a suitable bias means, such as the coil spring 60, which is held in compressed condition between the annular base cylinder spring retainer 62 threaded to the top of the base cylinder 14 and the annular plunger spring retainer 64 which extends inwardly of the plunger body 40 and forms the floor thereof.

Figure 3:
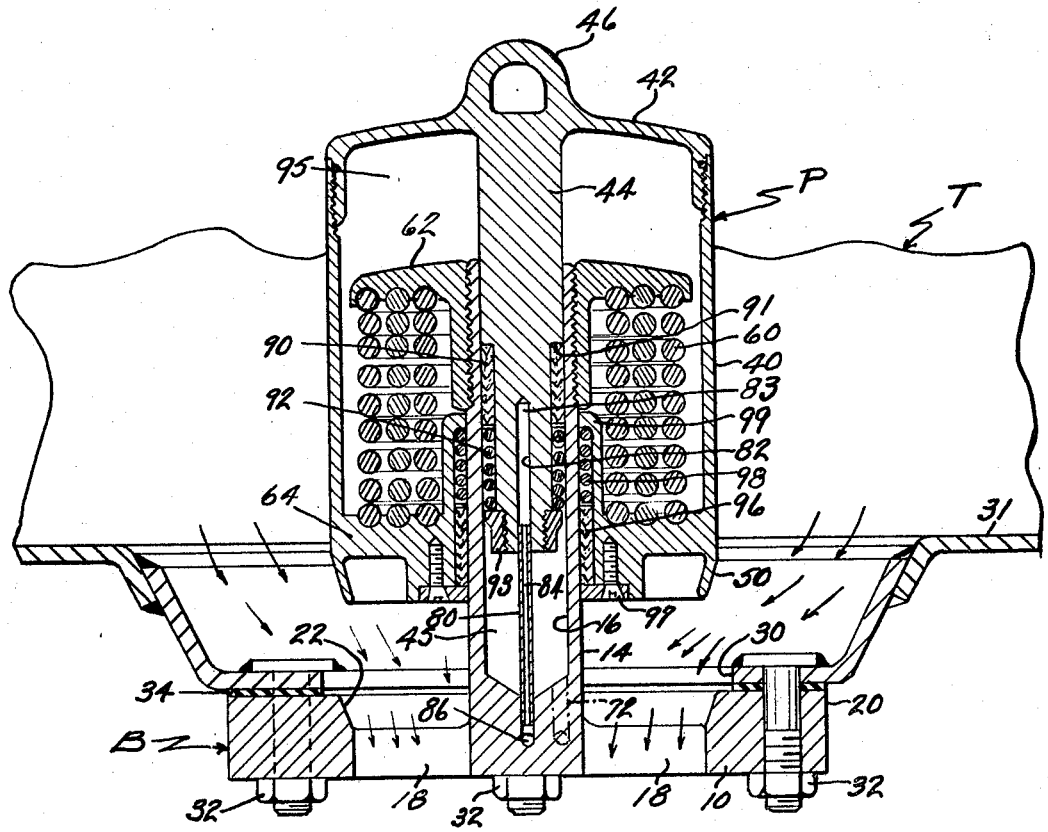
FIG. 3 is a front elevational sectional view taken along the line 3—3 of FIG. 2 and showing such valve in open position.

In operation, pressurized hydraulic fluid of predetermined pressure from a suitable associated source of fluid pressure enters the port 70 and flows through the passageway or duct 72, as indicated by the arrows in FIG. 1, and into the pressure cavity 45, where it forces the piston 44 and the plunger P upwardly against the force of the compressed spring 60 to unseat the skirt 50 from the seat 22 as shown in FIG. 3. When pressurized fluid is released from the pressure cavity 45, the spring 60 functions to force the plunger downwardly to its normally closed or fail-safe position as shown in FIG. 1.

To remove air from the duct 72 and the cavity 45 system during initial filling of such cavity with pressurized fluid, a tube or standpipe 80 is provided projecting upwardly from the floor of the bore 16 and extending partially into the piston bore 82 to form a cavity 83 between the end of the standpipe and the adjacent closed end of the bore 82. The standpipe 80 has a bore 84 which leads downwardly to a passageway 86 and thence out the port 88. Thus, any air initially in the duct 72 and the cavity 45 system, is forced upwardly between the longitudinal walls of the tube 80 and the piston bore 82 and into the cavity 83, thence down the standpipe bore 84, through the passageway 86, and out the port 88 to the atmosphere.

To prevent flow of pressurized fluid between the longitudinal walls of the base cylinder bore 16 and the plunger piston 44, suitable packing 90 is provided therebetween which is packed tightly against the annular shoulder 91 by the compressed coil spring 92, which, in turn, is secured on the free end portion of the piston by the threaded plug 93. Any seepage of pressurized fluid past the packing 90 will accumulate in the spring cavity 95 where it is trapped by the packing 96 which is retained in tightly packed condition between the outer longitudinal wall of the base cylinder 14 and the inner longitudinal wall of the plunger spring retainer 64 by the cap screw 97 which forces the packing 96 against the compressed spring 98 and against the plunger spring retainer shoulder 99.

With the present construction, it will be noted that only part of the flange 20 extends below or outwardly of the tank 31, the rest of the valve being disposed interiorly of the tank thus reducing clearance required and thereby protecting the valve from inadvertent damage. Additionally, it will be noted that the plunger P and its valve skirt 50 are free to rotate axially about the longitudinal axis of the opening 18, thus producing a highly effective seal of the skirt 50 with the seat 22 after long use and considerable wear and under all types of weather conditions. More specifically, such rotation permits an even wearing of the skirt and its spaced, coacting valve seat 22 as the skirt thus rotates on the seat during use.

Another feature of the invention is that prior cavities and pockets have been eliminated for ease of cleaning. Also, the present valve permits complete drainage of the tank 31.

It will be understood that any fluid which may become trapped in cavity 95, may be drained through a suitable plug disposed in the outer side wall of the cylinder body 40.

Additionally, a spacer of metal or of a suitable synthetic organic plastic such as "Teflon" (trademarked) may be interposed between the spring 92 and the packing 90 and between the spring 98 and the packing 96.

Also, a suitable discharge piping may be secured to the bottom of the discharge opening 30.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:

1. A valve including a base having an annular fluid outlet opening therein, a plunger reciprocable to and from said opening to selectively seal the same, said plunger having an annular relatively thin flexible skirt engageable with the opening to selectively seal the same, means for detachably connecting the base to a fluid discharge opening of an associated fluid storage tank in coaction therewith whereby the outlet opening and the discharge opening are in series such that the plunger controls fluid flow through the tank discharge opening, said valve being disposed substantially interiorly of the tank, a base cylinder extending upwardly from the base and containing a longitudinal cylinder bore open at the top, said plunger having a piston extending partially into the cylinder bore in reciprocable and circumferentially rotative coaction therewith to form a pressure cavity between the end of the piston and the bottom of the cylinder bore, said base having a passageway connected at one end to the pressure cavity and at the other end to an associated liquid pressure source for selectively admitting pressurized fluid into the cavity and thence forcing the piston and the plunger upwardly away from the outlet opening, bias means for biasing the plunger downwardly in sealing contact with the outlet opening when pressurized fluid is released from the pressure cavity, whereby the plunger may be reciprocated to and from said outlet opening and may be circumferentially rotated about the longitudinal axis of the outlet opening to even the wear on said skirt, packing disposed between the base cylinder and the plunger to prevent seepage of pressurized fluid into the associated fluid storage tank, said piston having a longitudinal piston bore open at the bottom, a tube secured to the floor of the cylinder bore and extending upwardly therefrom and into the piston bore to form a piston cavity between the end of the tube and the adjacent closed end of the piston bore, said base containing an air bleeding passageway leading at one end to the tank exterior and connected at the other end to the tube whereby, on initial filling of the pressure cavity with pressurized fluid, air trapped in the pressurized fluid passageway and in the pressure cavity is forced upwardly between the longitudinal walls of the tube and the piston bore, thence into the piston cavity, thence down the tube, and thence out the air bleeding passageway to the tank exterior.

References Cited
UNITED STATES PATENTS

| | | | |
|---|---|---|---|
| 1,473,474 | 11/1923 | Drake | 251—144 |
| 1,514,233 | 11/1924 | Searles et al. | 251—334 |
| 1,534,136 | 4/1925 | Ostrander | 251—144 |
| 2,549,689 | 4/1951 | Jurs | 251—144 |
| 2,726,840 | 12/1955 | Jurs et al. | 251—144 |
| 2,731,803 | 1/1956 | Reed | 251—144 |

M. CARY NELSON, *Primary Examiner.*

W. R. CLINE, *Assistant Examiner.*